United States Patent
Maeda

(10) Patent No.: US 9,858,170 B2
(45) Date of Patent: Jan. 2, 2018

(54) FUNCTION-CALLING-INFORMATION COLLECTION METHOD AND COMPUTER-READABLE RECORDING MEDIUM

(71) Applicant: FUJITSU LIMITED, Kawasaki-shi, Kanagawa (JP)

(72) Inventor: Munenori Maeda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 3 days.

(21) Appl. No.: 15/168,282

(22) Filed: May 31, 2016

(65) Prior Publication Data
US 2017/0031738 A1    Feb. 2, 2017

(30) Foreign Application Priority Data
Jul. 31, 2015 (JP) ................. 2015-152834

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 11/36 | (2006.01) |

(52) U.S. Cl.
CPC .................. G06F 11/3612 (2013.01)

(58) Field of Classification Search
None
See application file for complete search history.

(56) References Cited

U.S. PATENT DOCUMENTS

| | | | |
|---|---|---|---|
| 6,334,210 B1 | 12/2001 | Miura et al. | |
| 9,491,490 B1 * | 11/2016 | Toth | H04N 19/115 |
| 2007/0297444 A1 * | 12/2007 | Nishikawa | H04L 1/188 |
| | | | 370/465 |
| 2014/0122729 A1 * | 5/2014 | Hon | H04L 65/1069 |
| | | | 709/228 |
| 2014/0244592 A1 * | 8/2014 | Mande | G06F 17/30073 |
| | | | 707/661 |
| 2014/0245065 A1 * | 8/2014 | Weiner | G06F 11/3636 |
| | | | 714/37 |

FOREIGN PATENT DOCUMENTS

| | | |
|---|---|---|
| JP | 11-212837 | 8/1999 |
| JP | 2005-141392 | 6/2005 |
| JP | 2006-202134 | 8/2006 |

OTHER PUBLICATIONS

Andreas Knupfer et al., "Construction and Compression of Complete Call Graphs for Post-Mortem Program Trace Analysis," 2005, IEEE Computer Society, Proceedings of the 2005 IEEE International Conference on Parallel Processing, pp. 1-8, retrieved on Oct. 12, 2016 from http://ieeexplore.ieee.org/stamp/stamp.jsp?arnumber=1488612.*

* cited by examiner

Primary Examiner — Tuan Dao
Assistant Examiner — William C Wood
(74) Attorney, Agent, or Firm — Fujitsu Patent Center

(57) ABSTRACT

A function-calling-information collection method includes collecting, at time of execution of a function, calling information of concerned function, selecting whether or not to perform lossy compression of the collected calling information, storing, in a memory unit, the calling information compressed by a lossy compression when the lossy compression is selected, and storing, in the memory unit, the calling information without compression or compressed by a lossless compression when the lossy compression is not selected.

3 Claims, 16 Drawing Sheets

FIG.5A

```
_function:                          ┌UNWIND_STACK
   push ebp      ;STORE BASE POINTER │FUNCTION IS
   mov ebp, esp ;CHANGE VALUE OF BASE POINTER SO AS TO
                 INDICATE CURRENT STACK FRAME
   sub esp, x    ;REDUCE VALUE OF STACK POINTER BY VALUE EQUAL TO
                 SIZE OF LOCAL VARIABLES
```

UNWIND_STACK FUNCTION IS CALLED HERE

FIG.5B

```
mov esp, ebp ;REMOVE LOCAL VARIABLES
pop ebp      ;REVERT VALUE OF BASE POINTER
ret          ;RETURN FROM FUNCTION
```

FIG.6
(a) PACK FORMAT: INSTRUCTION ADDRESSES HAVE FIXED LENGTH; N=NUMBER OF INSTRUCTION ADDRESSES
(b) HASH FORMAT: SAMPLING DATA IS REDUCED AND HAVE VARIABLE LENGTH
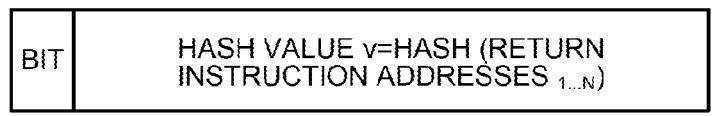
(c) HASH FORMAT: IN SURPLUS SPACE AFTER FILLING HASH VALUE, RETURN INSTRUCTION ADDRESSES ARE PACKED IN PACK FORMAT
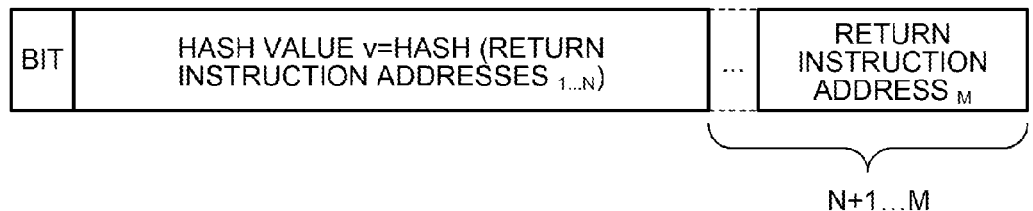

FUNCTION-CALLING-INFORMATION COLLECTION METHOD AND COMPUTER-READABLE RECORDING MEDIUM

CROSS-REFERENCE TO RELATED APPLICATION

This application is based upon and claims the benefit of priority of the prior Japanese Patent Application No. 2015-152834, filed on Jul. 31, 2015, the entire contents of which are incorporated herein by reference.

FIELD

The embodiment discussed herein is related to a function-calling-information collection method and a computer-readable recording medium.

BACKGROUND

With the object of enhancing the execution performance of a computer program and analyzing the performance characteristics, a performance profile of the computer program is obtained. The performance profile includes, for example, the execution frequency of the functions processed during the execution of the computer program. If the functions having a high execution frequency are enhanced in performance, then it becomes possible to enhance the functions of the entire computer program.

One of the methods for obtaining the execution frequency includes sampling the values of the instruction counter of a central processing unit (CPU), that is, sampling the execution addresses at regular intervals; storing the sampled execution addresses; determining the functions corresponding to the addresses stored after the completion of execution of the computer program; and calculating the function-by-function appearance count as the execution count. The appearance count represents the frequency of the functions that are executed at the timings sampled at regular intervals, and is different than the count of actual execution of the functions. However, the functions that are repeatedly executed have a longer execution period and a higher appearance count.

The execution frequency of a function is often analyzed based on the calling relationships of the function. As an example, if a function C has the execution frequency of 100 times, the analysis indicates that the function C is called in order of function A→function B→function C for 80 times and is called in order of function X→function Y→function Z→function C for 20 times.

Meanwhile, a conventional technology is known in which a profile information acquisition target such as a method is specified; whether or not the specified profile information acquisition target is running is monitored; and profile information is obtained when the specified profile information acquisition target is running. That enables achieving reduction in the overhead for obtaining the profile information.

a conventional technology is known in which function calling in a source program is detected and identification numbers are assigned according to the types of call pairs; and a table area is set for storing the function calling count for each identification number. That enables achieving reduction in the memory area and the overhead during profile processing.

Furthermore, a conventional technology is known in which, in a source program, an operation is inserted for setting an area for a table used to store the calling count for each dynamic call pair representing a combination of a dynamic calling-side function and a dynamic called-side function. That enables achieving reduction in the amount of calculation and the amount of memory at the time of collecting call pair information.

[Patent Literature 1] Japanese Laid-open Patent Publication No. 2005-141392

[Patent Literature 2] Japanese Laid-open Patent Publication No. 11-212837

[Patent Literature 3] Japanese Laid-open Patent Publication No. 2006-202134

In the case of analyzing the execution frequency of a function based on the calling relationships of the function; function calling relationship information also needs to be stored in the memory, which leads to an increase in the volume of profile information stored in the memory. As the volume of profile information stored in the memory increases, it may affect the execution performance of the computer program that is the target for collecting profile information.

SUMMARY

According to an aspect of an embodiment, a function-calling-information collection method includes collecting, at time of execution of a function, calling information of concerned function, selecting whether or not to perform lossy compression of the collected calling information, storing, in a memory unit, the calling information compressed by a lossy compression when the lossy compression is selected, and storing, in the memory unit, the calling information without compression or compressed by a lossless compression when the lossy compression is not selected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a diagram illustrating an exemplary code executed when a function is called;

FIG. 5B is a diagram illustrating an exemplary code executed at the time of returning from a function;

FIG. 6 is a diagram illustrating formats of sampling data;

DESCRIPTION OF EMBODIMENT

Preferred embodiments of the present invention will be explained with reference to accompanying drawings. However, the technology disclosed herein is not limited by the embodiment.

Figure 1:
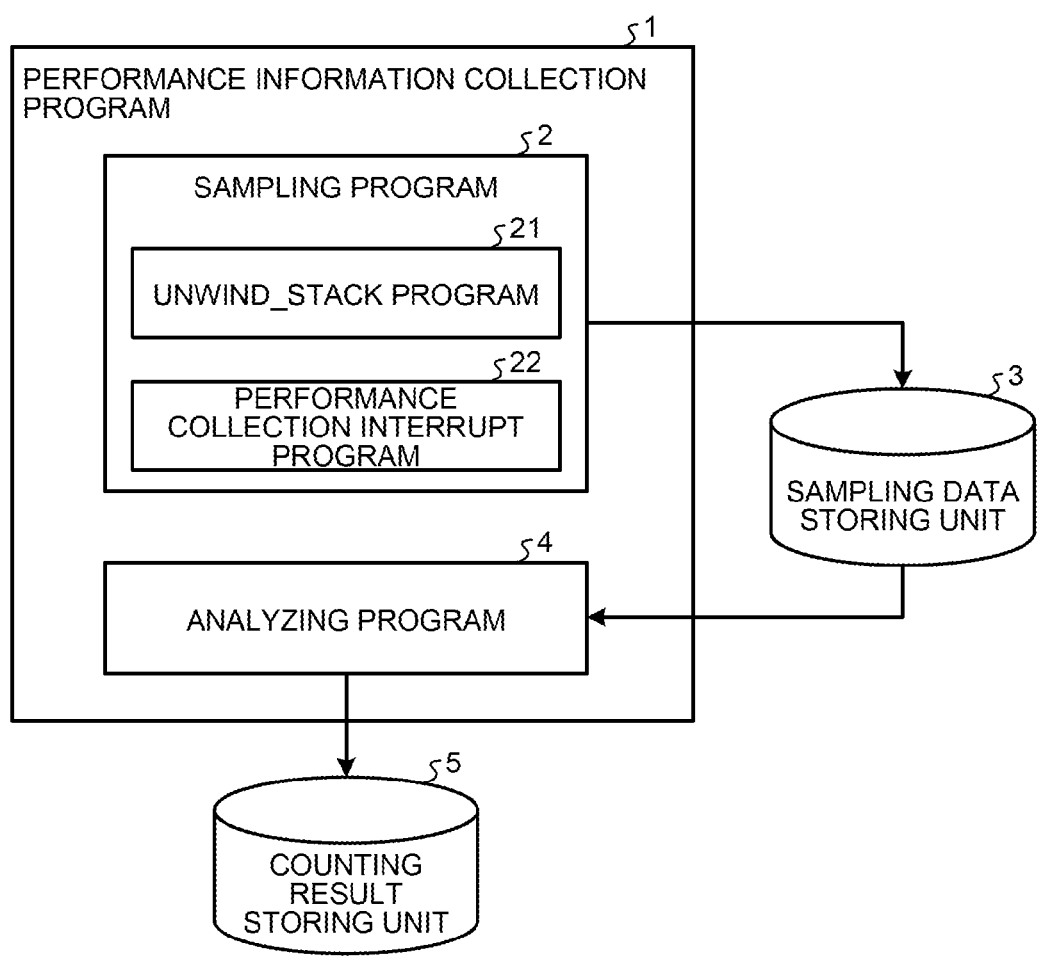
FIG. 1 is a diagram for explaining a performance information collection program according to an embodiment.

Firstly, the explanation is given about a performance information collection program according to the embodiment. FIG. 1 is a diagram for explaining a performance information collection program according to the embodiment. As illustrated in FIG. 1, a performance information collection program 1 according to the embodiment includes a sampling program 2 and an analyzing program 4.

The sampling program 2 is a computer program for sampling function calling relationship information, and storing the sampled function calling relationship information as sampling data in a sampling data storing unit 3. The sampling program 2 includes an unwind_stack program 21 and a performance collection interrupt program 22.

The unwind_stack program 21 obtains the function calling relationship information from a stack and stores the information as sampling data in a register. The unwind_stack program 21 is run at the start of execution of each function of a performance collection target program, which is a computer program for performance collection.

The performance collection interrupt program 22 is run at regular time intervals so that the sampling data, which is stored by the unwind_stack program 21 in a register, gets stored in a memory. The sampling data stored in the memory is then written into the sampling data storing unit 3 when the collection of performance information is completed.

Herein, each timing at which the unwind_stack program 21 obtains the function calling relationship information represents the start of execution of a function; and the timing at which the performance collection interrupt program 22 stores the function calling relationship information arrives at a regular time interval. Thus, the two types of timings are different.

The analyzing program 4 reads the function calling relationship information from the sampling data storing unit 3; counts the appearance count of a function based on the calling relationship of the function; and stores the counting result in a counting result storing unit 5.

Figure 2:
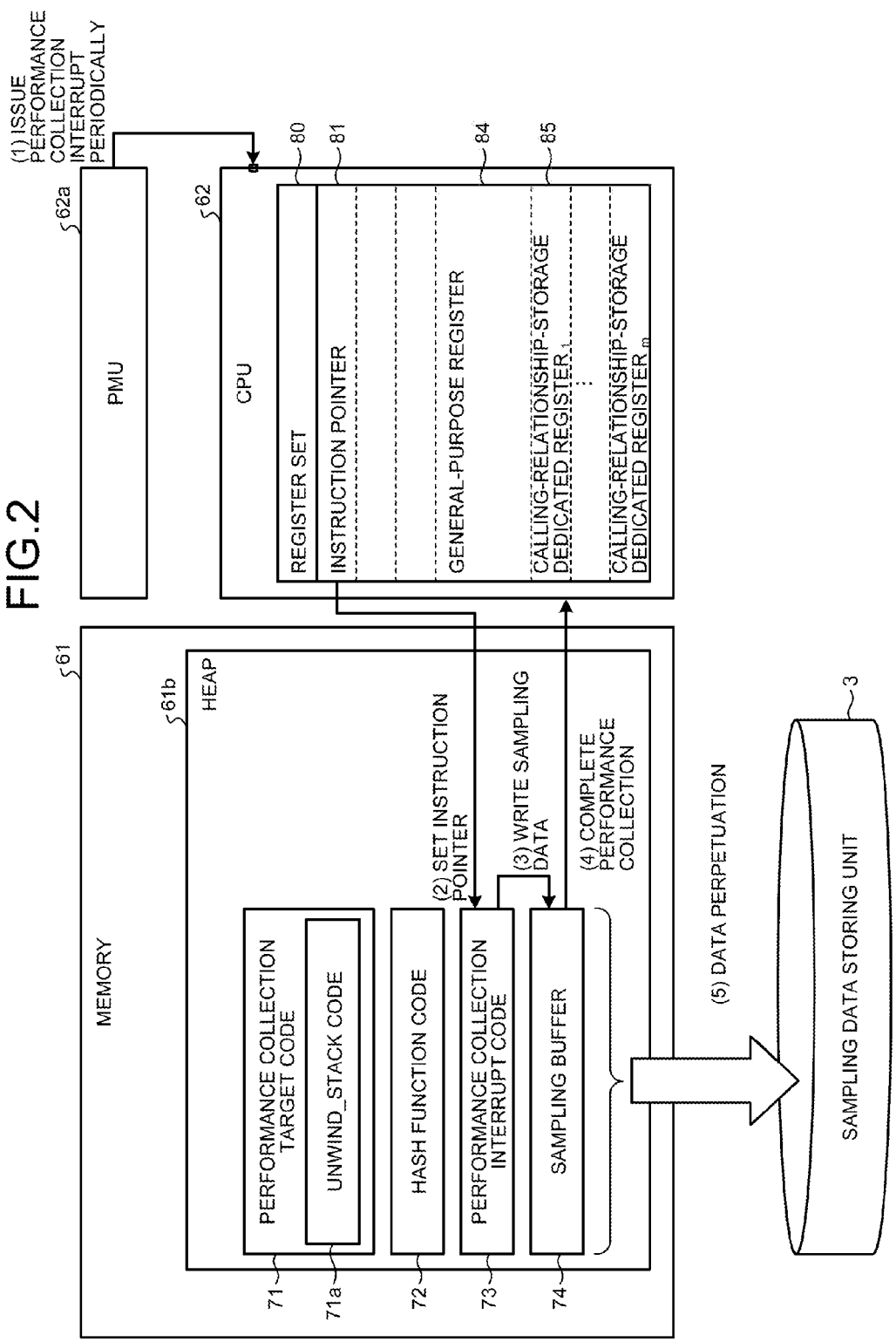
FIG. 2 is a diagram for explaining the operations performed using a performance collection interrupt program.

Given below is the explanation about the operations performed using the performance collection interrupt program 22. FIG. 2 is a diagram for explaining the operations performed using the performance collection interrupt program 22. With reference to FIG. 2, it is assumed that a performance collection target code 71 that is stored in a heap 61b of a memory 61 is being executed. Herein, the performance collection target code 71 represents the executable code of the performance collection target program. The performance collection target code 71 includes an unwind_stack code 71a that represents the executable code of the unwind_stack program 21.

The heap 61b is a dynamically-securable memory area in which executable codes of computer programs are stored along with data. In the heap 61b, not only the performance collection target code 71 is stored but also a hash function code 72, a performance collection interrupt code 73, and a sampling buffer 74 are included. The hash function code 72 represents the executable code of a hash function meant for calculating hash values. The performance collection interrupt code 73 represents the executable code of the performance collection interrupt program 22. The sampling buffer 74 represents an area for storing the sampling data collected using the performance collection interrupt program 22.

As illustrated in FIG. 2, (1) a performance monitoring unit (PMU) 62a, which monitors the performance of a CPU 62, periodically issues a performance collection interrupt to the CPU 62. Meanwhile, instead of using the PMU 62a, a clock counter or a timer can periodically issue a performance collection interrupt to the CPU 62.

Then, (2) the CPU 62 performs interrupt handling. More particularly, the CPU 62 sets the value of an instruction pointer 81 at the top of the performance collection interrupt code 73, and executes the performance collection interrupt code 73. Herein, the instruction pointer 81 represents a register for storing the address of the code to be executed, and is included in a register set 80 of the CPU 62.

Subsequently, (3) The performance collection interrupt code 73 reads function calling relationship information from m number of (m is a positive integer) calling-relationship-storage dedicated registers 85, and writes the information as sampling data in the sampling buffer 74. Herein, the calling-relationship-storage dedicated registers 85 constitute a general-purpose register 84 included in the register set 80. The function calling relationship information is stored in the m number of calling-relationship-storage dedicated registers 85 using the unwind_stack program 21.

Then, (4) upon the completion of performance information collection, it marks the end of the data collection using the performance collection interrupt program 22. Subsequently, (5) the sampling program 2 achieves data perpetuation, that is, writes the sampling data in the sampling data storing unit 3. Meanwhile, the sampling data is written in the sampling data storing unit 3 also when the sampling buffer 74 becomes full.

In this way, the performance collection interrupt program 22 is run at regular time intervals. Every time the performance collection interrupt program 22 is run, the function calling relationship information stored in the calling-relationship-storage dedicated registers 85 is stored in the sampling buffer 74. As a result, it becomes possible to collect the function calling relationship information.

Figure 3:
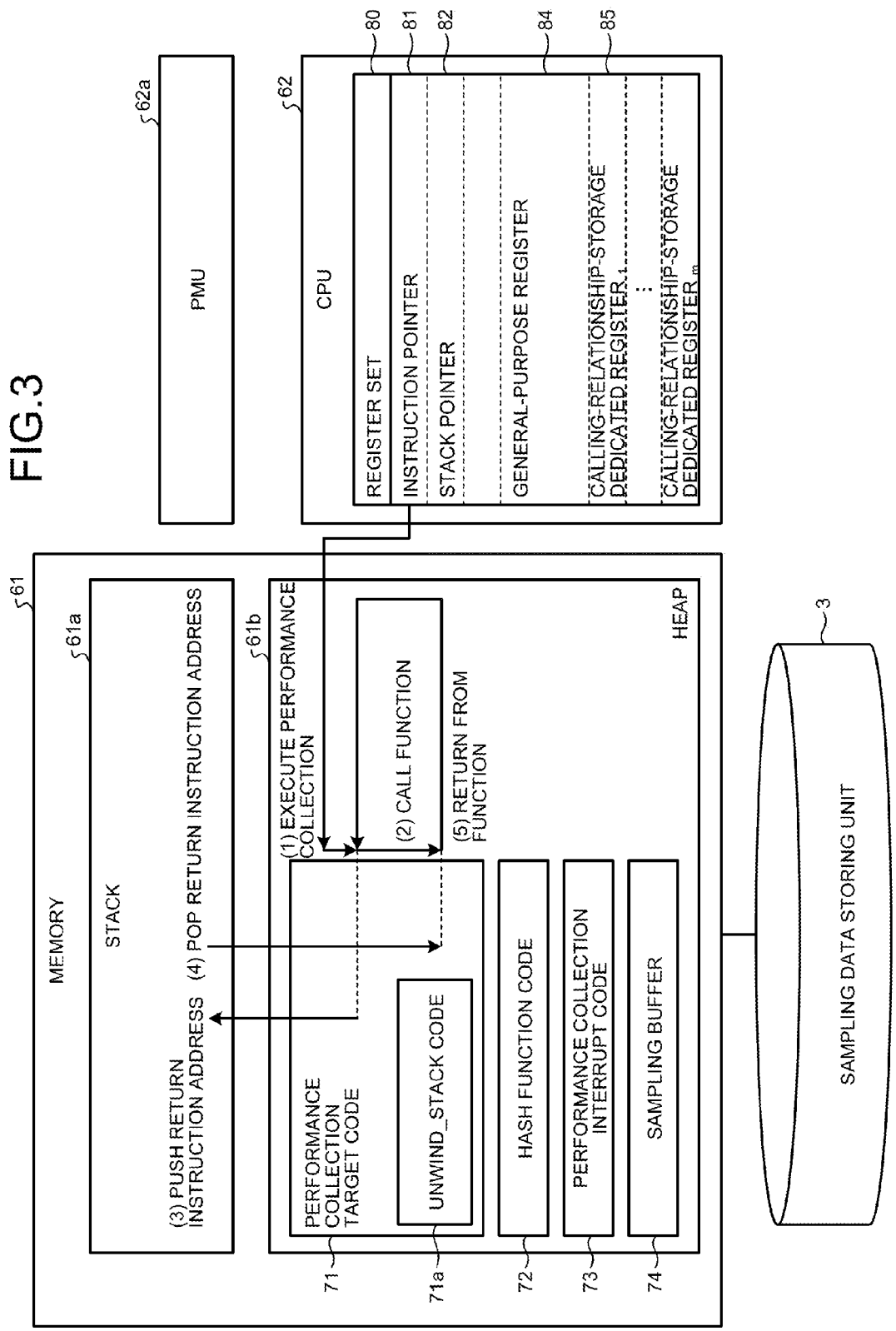
FIG. 3 is a diagram for explaining the operations performed using a performance collection target program.

Explained below with reference to FIGS. 3 to 7 are the operations performed using the unwind_stack program 21. Firstly, the explanation is given about the operations performed using the performance collection target program. FIG. 3 is a diagram for explaining the operations performed using the performance collection target program.

As illustrated in FIG. 3, (1) the execution of the performance collection target code 71 is started; and the instructions at the addresses pointed by the instruction pointer 81 are executed in order. Then, (2) when a function is called during the execution, (3) a return instruction address stored by the instruction pointer 81 is pushed in a stack 61a. Herein, the stack 61a represents an area in the memory 61 in which data is stored according to the first-in-last-out (FILO) system. The position in the stack 61a at which data is to be stored is specified by a stack pointer 82 included in the register set 80.

Then, (4) upon the completion of the execution of the function, the return instruction address that has been pushed in the stack 61a is popped, and (5) is set in the instruction pointer 81 so that returning from the function is achieved.

In this way, every time a function is called, a return instruction address is stacked in the stack 61a. Thus, the unwind_stack program 21 stores a series of return instruction addresses, which are stacked in the stack 61a, as function calling relationship information in the calling-relationship-storage dedicated registers 85.

Figure 4:
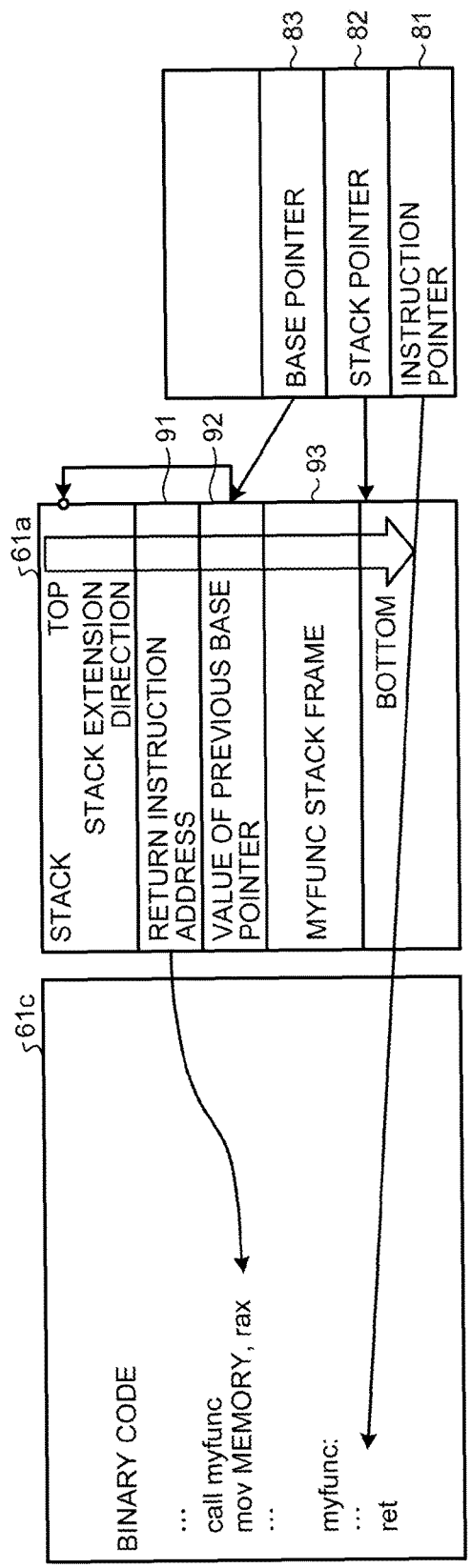
FIG. 4 is a diagram for explaining the data stacked in a stack when a function is called.

Meanwhile, in the stack 61a, data other than the return instruction addresses is also stored when a function is called. FIG. 4 is a diagram for explaining the data stacked in the stack 61a when a function is called. In FIG. 4 is illustrated a case in which a function myfunc is called during the execution of a binary code 61c. Moreover, in FIG. 4, a base pointer 83 points to the area immediately before a stack frame representing the location for storing the local variables of the called function. In the area pointed by the base pointer 83, the value of the previous base pointer 83 is stored.

As illustrated in FIG. 4, when the function myfunc is called, the stack 61a gets stacked with a return instruction address 91, a value 92 of the previous base pointer, and a myfunc stack frame 93. Herein, the return instruction address 91 as well as the value 92 of the previous base pointer has a fixed length. In contrast, the length of the stack frame is variable dependent on the number of local variables used in a function. Thus, the unwind_stack program 21 sequentially tracks the value 92 of the previous base pointer, and obtains a series of return instruction addresses from the stack 61a.

The base pointer 83 and the stack frame are stacked by the code executed when a function is called. FIG. 5A is a diagram illustrating an exemplary code executed when a function is called. In FIG. 5A, "push ebp" represents an instruction for storing the value of the base pointer 83 in the stack 61a. Moreover, "move ebp, esp" changes the value of the base pointer 83 in such a way that the base pointer 83 points at the current stack frame. Furthermore, "sub esp, x" decrements the value of the stack pointer 82 by a value equal to the size of the local variables. Meanwhile, in the stack 61a, data is stacked from the upper addresses toward the lower addresses. Moreover, the unwind_stack program 21 is called before implementing "push ebp", and obtains a series of return instruction addresses from the stack 61a.

FIG. 5B is a diagram illustrating an exemplary code executed at the time of returning from a function. In FIG. 5B, "move esp, ebp" removes local variables. Moreover, "pop ebp" reverts the value of the base pointer 83. Furthermore "ret" enables returning from the called function.

FIG. 6 is a diagram illustrating formats of the sampling data. As illustrated in FIG. 6, the formats of the sampling data include a pack format illustrated in (a) in FIG. 6 and a hash format illustrated in (b) in FIG. 6. Whether or not the sampling data has the pack format or the hash format is distinguished by the first bit of the sampling data. In the pack format, a single set of sampling data is packed with N number of (N is a positive integer) return instruction addresses having a fixed length. Moreover, in the pack format, the return instruction addresses can be subjected to lossless compression.

In the hash format, a single set of sampling data represents a hash value calculated from N number of return instruction addresses. In (b) in FIG. 6, HASH represents the hash function. Moreover, "return instruction addresses$_1 \ldots _N$" represents the N number of return instruction addresses. In the hash format, the sampling data has a variable length, and the size of the sampling data becomes smaller.

Meanwhile, as far as the hash format is concerned, as illustrated in (c) in FIG. 6, it is alternatively possible to have a format in which the sampling data has a fixed length and, in the surplus space available after filling the hash value, M-N number of (M is a positive integer equal to or greater than N) return instruction addresses are packed in the pack format. In this format, as compared to the format in which a single set of sampling data represents only the hash value, it becomes possible to increase the volume of information in a single set of sampling data.

Meanwhile, in FIG. 6, whether or not the pack format is used or the hash format is used is distinguished using the first bit of the sampling data. However, since the sampling data in the pack format is characterized by the packing of return instruction addresses, the first bit can also be omitted.

The unwind_stack program 21 stores the N number of return instruction addresses in the hash format or the pack format in the m number of calling-relationship-storage dedicated registers 85. More particularly, at the time of storing the N number of return instruction addresses in the m number of calling-relationship-storage dedicated registers 85, the unwind_stack program 21 selects the hash format or the pack format using random numbers or pseudorandom numbers, and stores the return instruction addresses in the selected format.

Meanwhile, in the unwind_stack program 21, a 1-bit selection flag can be provided for each function so that, when a function is called, the corresponding selection flag can be rewritten. When the selection flag is "0", the pack format can be selected. When the selection flag is "1", the hash format can be selected.

Figure 7:
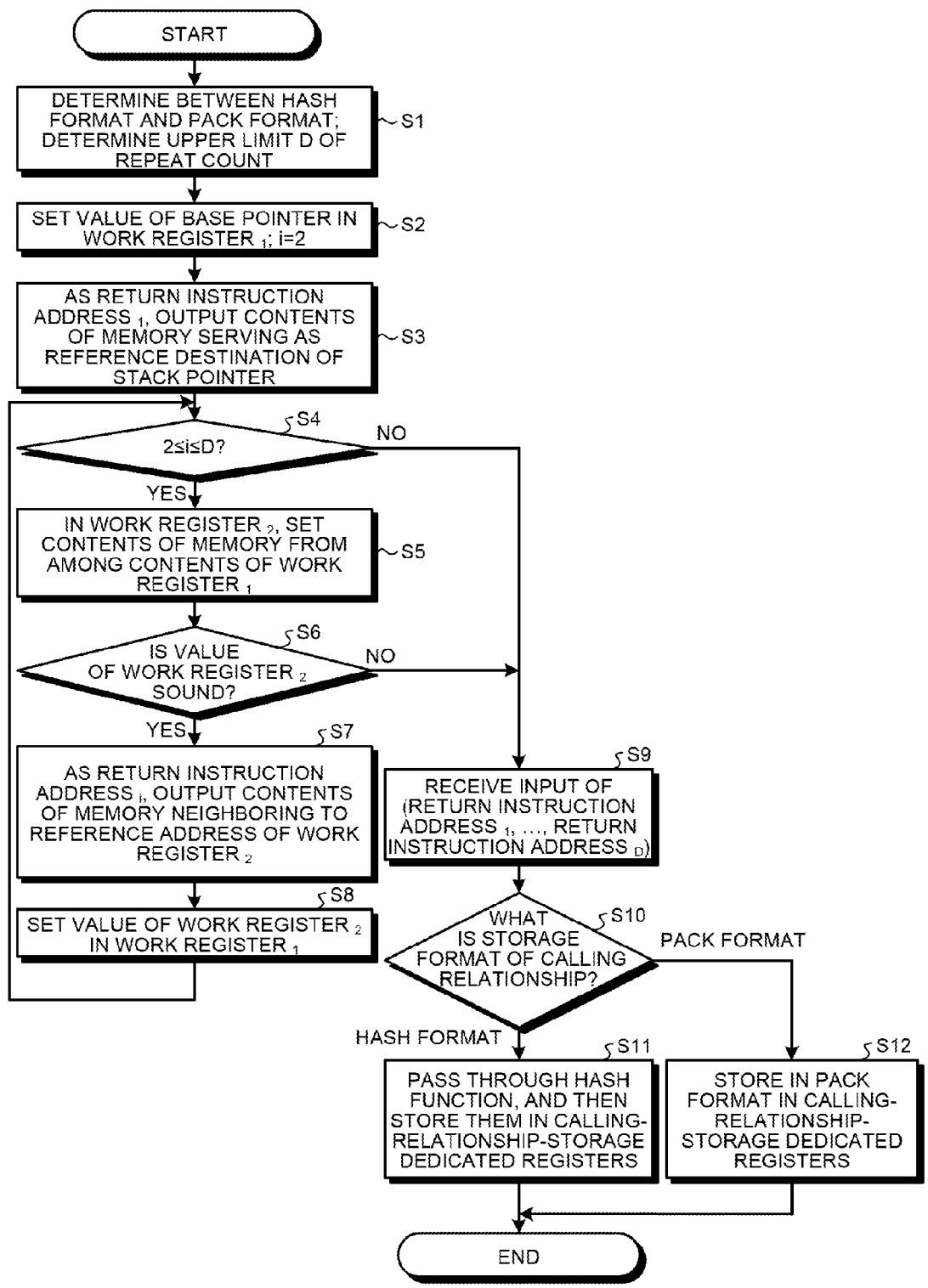
FIG. 7 is a flowchart for explaining an exemplary flow of operations performed using an unwind_stack program.

FIG. 7 is a flowchart for explaining an exemplary flow of operations performed using the unwind_stack program 21. As illustrated in FIG. 7, the unwind_stack program 21 determines whether the hash format or the pack format is to be used, and sets an upper limit D of the repeat count (Step S1). Herein, D=N holds true. However, when the hash format illustrated in (c) in FIG. 6 is used, D=M holds true.

Then, the unwind_stack program 21 sets the value of the base pointer 83 in a work register$_1$. Initial value of i is set to "2" (Step S2) and outputs, as a return instruction address$_1$, the contents of the memory 61 serving as the reference destination of the stack pointer (Step S3). Subsequently, the unwind_stack program 21 determines whether or not i is equal to or greater than two and is equal to or smaller than D (Step S4). If i is not equal to or greater than two and is equal to or smaller than D (Step S4 NO), then the system control proceeds to Step S9. Herein, i represents the repeat count that is incremented by one every time the unwind_stack program 21 obtains a single return instruction address.

When i is equal to or greater than two and is equal to or smaller than D (Step S4 YES), the unwind_stack program 21 sets, in a work register$_2$, the contents of the memory 61 from among the contents of the work register$_1$ (Step S5). As a result, in the work register$_2$, the value of the calling-side base pointer 83 is set.

Then, the unwind_stack program 21 determines whether or not the value of the work register$_2$ is sound (Step S6). Since the value of the work register$_2$ represents the value of the base pointer 83, the unwind_stack program 21 checks the soundness by checking the pointed area in the stack 61a.

Moreover, the value of the previous base pointer 83 is greater than the value of the current base pointer 83 by a value equal to the area required for storing the information related to a single function. Herein, although the area for storing the information related to a single function is dependent on the number of local variables, it is within a certain range. Thus, the unwind_stack program 21 makes use of such characteristics of the values of the base pointer 83, and checks the soundness.

If the value of the work register$_2$ is not sound (Step S6 NO), then the system control proceeds to Step S9. On the other hand, when the value of the work register$_2$ is sound (Step S6 YES), the unwind_stack program 21 outputs, as a return instruction address i, the contents of the memory 61 in the neighboring addresses of the reference address of the work register$_2$ (for example, the address of (the contents of the work register$_2$+8)) (Step S7). Herein, an address is assumed to be of 64 bits=8 bytes. Then, the unwind_stack program 21 sets the value of the work register$_2$ in the work register$_1$ (Step S8) and increments i by 1. The system control then returns to Step S4.

Subsequently, the unwind_stack program 21 receives input of (the return instruction address$_1$, . . . , the return instruction address$_D$) output at Steps S3 and S7 (Step S9), and determines the storage format of calling relationship (Step S10). If the storage format of calling relationship is the hash format, the unwind_stack program 21 passes (the return instruction address$_1$, . . . , the return instruction address$_D$) through the hash function, and then stores the addresses in the calling-relationship-storage dedicated registers 85 (Step S11). When the storage format of calling relationship is the pack format, the unwind_stack program 21 stores (the return instruction address$_1$, . . . , the return instruction address$_D$) in the calling-relationship-storage dedicated registers 85 in the pack format (Step S12).

In this way, the unwind_stack program 21 tracks the stack 61a using the values of the base pointer 83 and obtains a series of return instruction addresses, and stores the return instruction addresses in the hash format or the pack format in the calling-relationship-storage dedicated registers 85. Moreover, the return instruction addresses stored in the calling-relationship-storage dedicated registers 85 are stored in the memory 61 by the performance collection interrupt program 22. Thus, as compared to a case in which the hash format is not used, the unwind_stack program 21 can reduce the volume of function calling relationship information in the memory 61.

Figure 8:
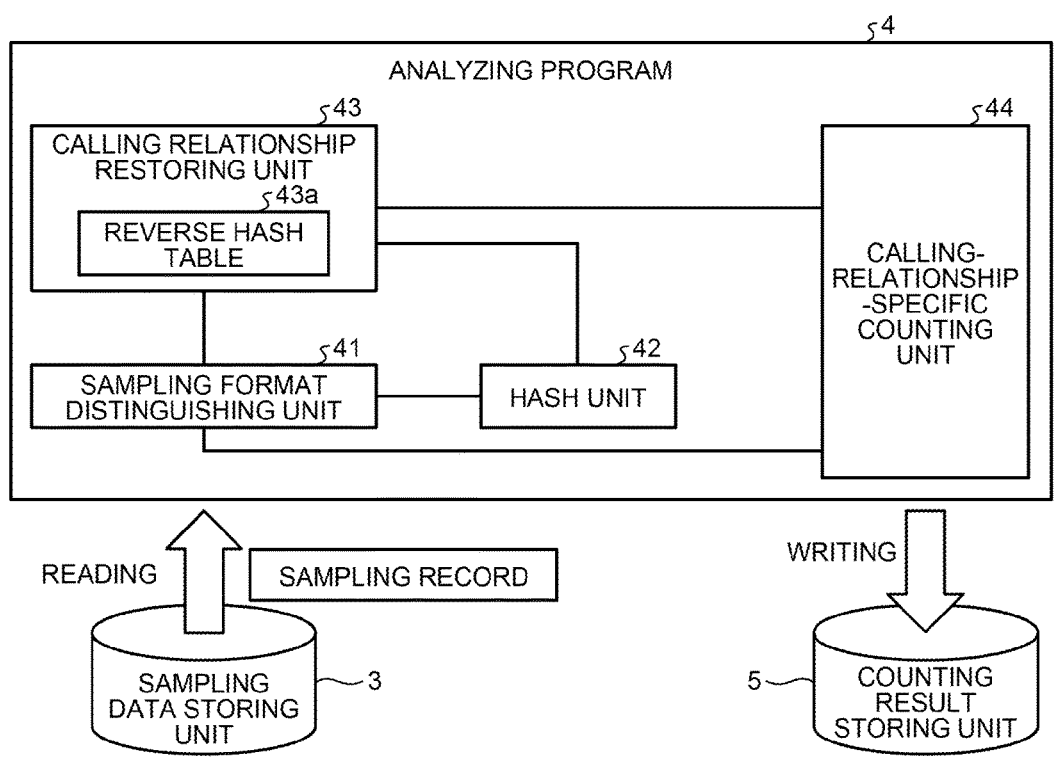
FIG. 8 is a diagram illustrating a functional configuration of an analyzing program.

Explained below with reference to FIGS. 8 to 12 is the analyzing program 4. FIG. 8 is a diagram illustrating a functional configuration of the analyzing program 4. As illustrated in FIG. 4, the analyzing program 4 includes a sampling format distinguishing unit 41, a hash unit 42, a calling relationship restoring unit 43, and a calling-relationship-specific counting unit 44.

The analyzing program 4 processes the sampling data, which is stored by the sampling data storing unit 3, in two passes. In the first pass, the analyzing program 4 uses sampling records having only the pack format and creates a reverse hash table 43a. Herein, a sampling record represents a single set of sampling data. The reverse hash table 43a represents a table for searching the hash values for the function calling relationship information. In the second pass, the analyzing program 4 counts the function calling relationships using all sampling records. Given below is the explanation of the pass-by-pass operations performed by each functional component of the analyzing program 4.

Figure 9A:
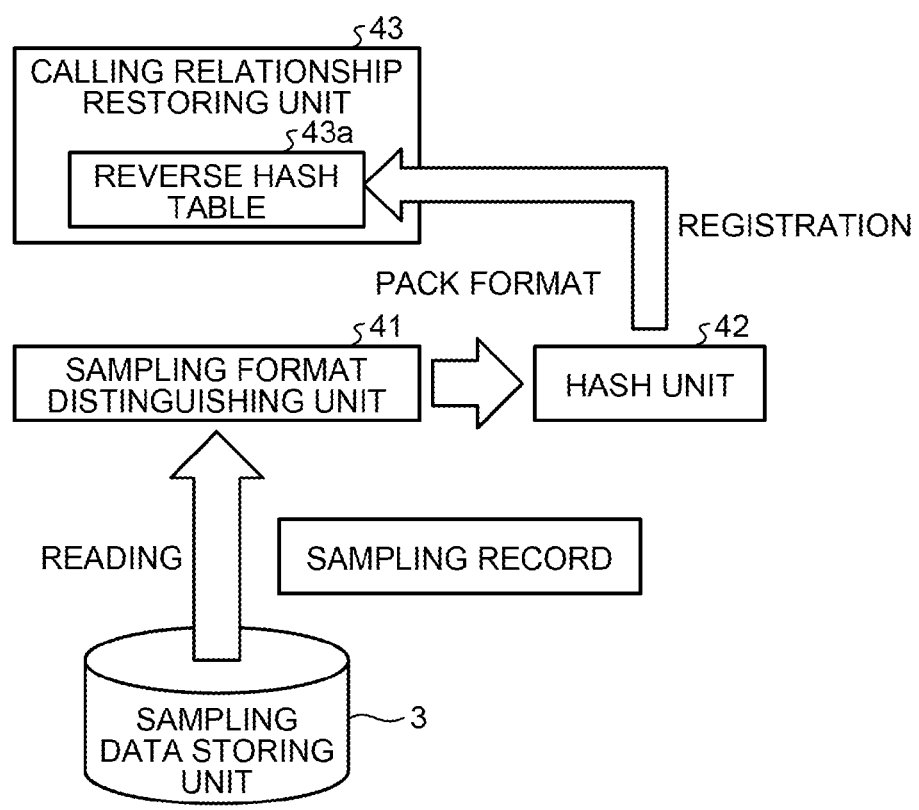
FIG. 9A is a diagram for explaining the first pass of the analyzing program.

FIG. 9A is a diagram for explaining the first pass of the analyzing program 4. As illustrated in FIG. 9A, the sampling format distinguishing unit 41 reads a sampling record from the sampling data storing unit 3, and determines the data format of the sampling record. If the data format is determined to be the pack format, then the sampling format distinguishing unit 41 sends the sampling record to the hash unit 42. If the data format is determined to be the hash format, no operations are performed with respect to the sampling record.

The hash unit 42 calculates the hash value of the function calling relationship information included in the sampling record, and sends the calculated hash value and the function calling relationship information to the calling relationship restoring unit 43. Subsequently, the calling relationship restoring unit 43 registers the hash value in a corresponding manner to the function calling relationship information in the reverse hash table 43a.

Figure 9B:
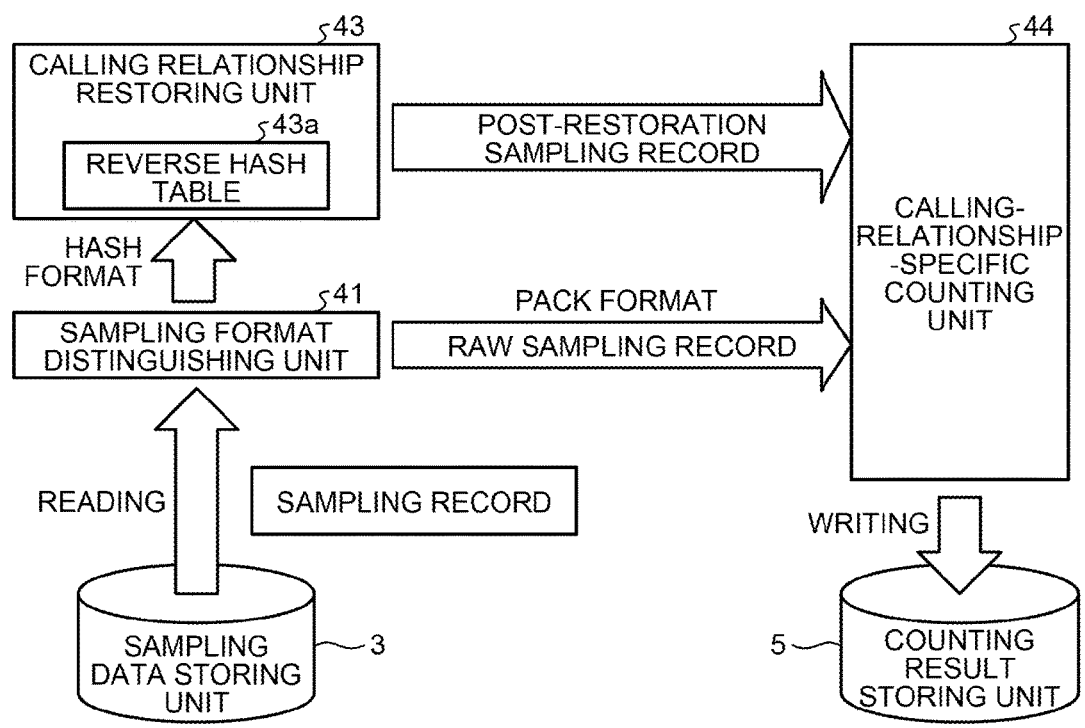
FIG. 9B is a diagram for explaining the second pass of the analyzing program.

FIG. 9B is a diagram for explaining the second pass of the analyzing program 4. As illustrated in FIG. 9B, the sampling format distinguishing unit 41 reads a sampling record from the sampling data storing unit 3, and determines the data format of the sampling record. If the data format is determined to be the hash format, then the sampling format distinguishing unit 41 sends the sampling record to the calling relationship restoring unit 43. If the data format is determined to be the pack format, the sampling format distinguishing unit 41 sends the sampling record to the calling-relationship-specific counting unit 44.

The calling relationship restoring unit 43 searches the reverse hash table 43a using the hash value included in the sampling record having the hash format, and restores the function calling relationship information. Then, the calling relationship restoring unit 43 sets the restored function calling relationship information to have the format of the sampling record, and sends it to the calling-relationship-specific counting unit 44.

The calling-relationship-specific counting unit 44 counts the sampling records, which are received from the sampling format distinguishing unit 41 and the calling relationship restoring unit 43, for each function calling relationship, and writes the counting result in the counting result storing unit 5.

Figure 10A:
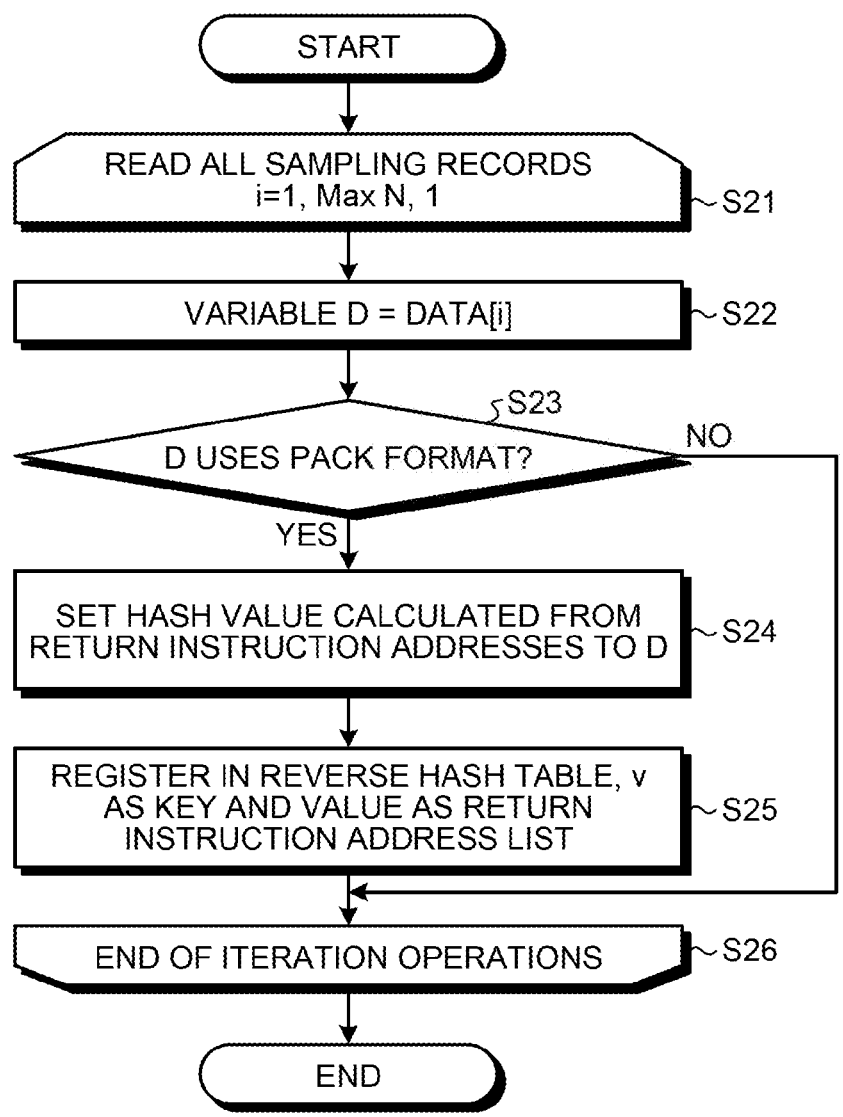
FIG. 10A is a flowchart for explaining a flow of operations performed in the first pass.

FIG. 10A is a flowchart for explaining a flow of operations performed in the first pass. As illustrated in FIG. 10A, the analyzing program 4 reads all sampling records one by one from the sampling data storing unit 3 (Step S21), and performs operations between Steps S21 and S26 with respect to each sampling record.

Meanwhile, in FIGS. 10A, 10B, 11A, and 11B, "i=1, Max N, 1" implies repeated increment in an iteration variable i by one until the iteration variable i becomes equal to N. Herein, N represents the number of sampling records.

The analyzing program 4 sets DATA[i] in a variable D (Step S22), and determines whether or not the variable D uses the pack format (Step S23). Herein, DATA[i] represents the i-th sampling record. If the variable D does not use the pack format (Step S23 NO), then the analyzing program 4 processes the next sampling record (Step S26).

On the other hand, when the variable D uses the pack format (Step S23 YES), the analyzing program 4 sets, in a variable v, the hash value calculated from the return instruction addresses$_{1 \ldots N}$ of the variable D (Step S24). That is, v=HASH(return instruction addresses$_{1 \ldots N}$) is set. Then, in the reverse hash table 43a, the analyzing program 4 registers the variable v as the key and registers the value as the return instruction address list, that is, as the return instruction addresses$_{1...N}$ (Step S25).

In this way, in the first pass, the analyzing program 4 creates the reverse hash table 43a from the sampling records having the pack format. Hence, in the second pass, the analyzing program 4 can make use of the reverse hash table 43a and restore the sampling records having the hash format.

Figure 10B:
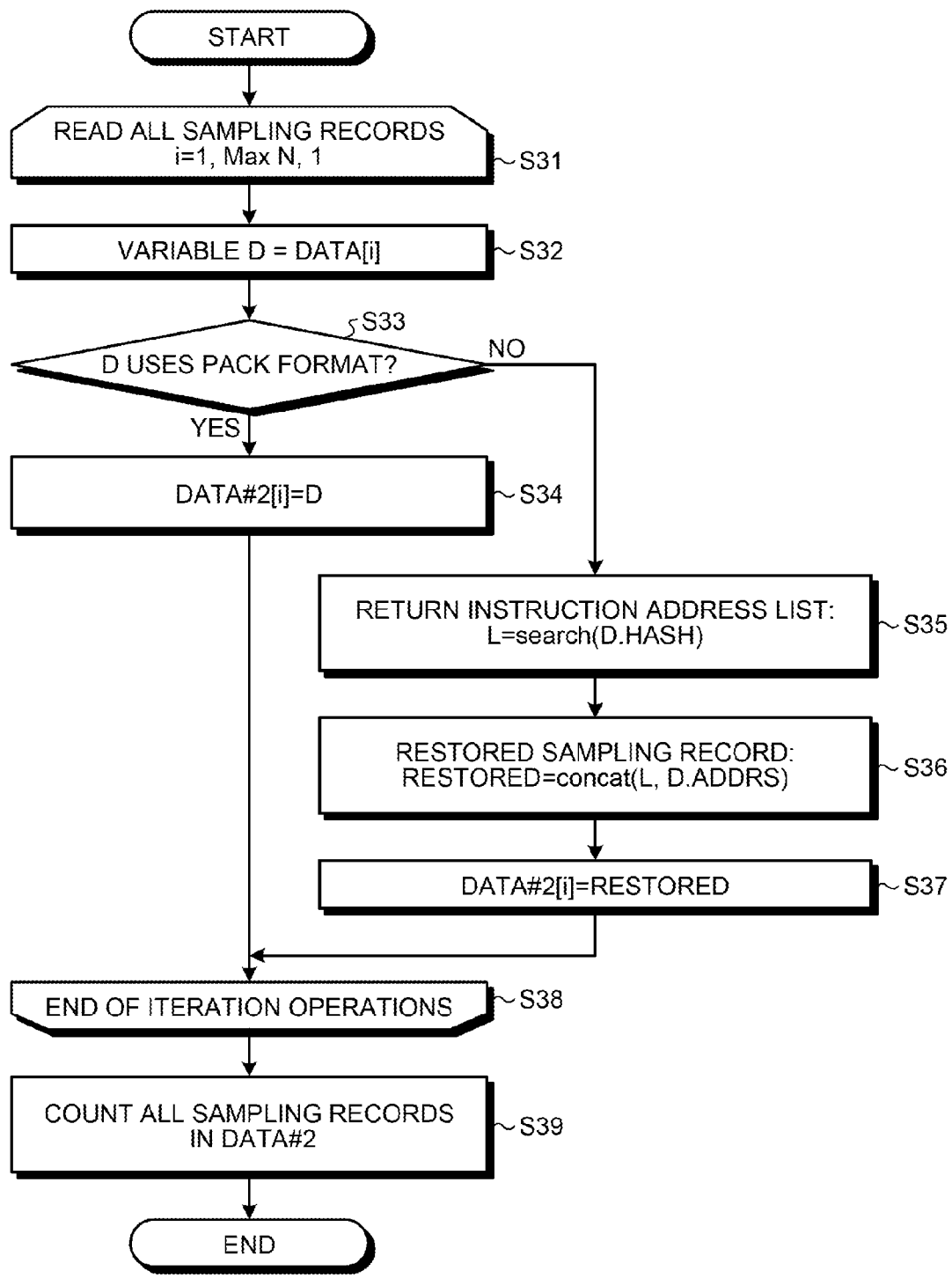
FIG. 10B is a flowchart for explaining a flow of operations performed in the second pass.

FIG. 10B is a flowchart for explaining a flow of operations performed in the second pass. In FIG. 10B, the hash format represents the format illustrated in (c) in FIG. 6. As illustrated in FIG. 10B, the analyzing program 4 reads all sampling records one by one from the sampling data storing unit 3 (Step S31), and performs operations between Steps S31 and S38 with respect to each sampling record.

The analyzing program 4 sets DATA[i] in the variable D (Step S32), and determines whether or not the variable D uses the pack format (Step S33). If the variable D uses the pack format (Step S33 YES), then the analyzing program 4 stores the variable D in a file DATA #2 (Step S34). That is, the analyzing program 4 sets the i-th sampling record DATA #2[i]=D (Step S38).

On the other hand, if the variable D does not use the pack format (Step S33 NO), then the analyzing program 4 searches the reverse hash table 43a with D.HASH as the key, and sets the search result as a return instruction address list L (Step S35). Herein, D.HASH represents the hash value portion of the sampling record D having the hash format. That is, if "search" represents the function for searching the reverse hash table 43a, then the return instruction address list L=search(D.HASH) holds true.

Then, the analyzing program 4 concatenates two lists L and D.ADDRS, and generates a restored sampling record RESTORED (Step S36). Herein, D.ADDRS represents the portion excluding the hash value of the sampling record D having the hash format. That is, if "concat" represents the function for concatenating lists, then RESTORED=concat (L, D.ADDRS) holds true.

Subsequently, the analyzing program 4 stores the restored sampling record RESTORED in DATA #2[i] (Step S37). That is, DATA #2[i]=RESTORED holds true (Step S38).

Once the processing of all sampling records is completed, the analyzing program 4 counts all sampling records included in DATA #2 according to the function calling relationships (Step S39).

In this way, by restoring the sampling records having the hash format using the reverse hash table 43a, the analyzing program 4 can count all sampling records according to the function calling relationships.

Figure 11A:
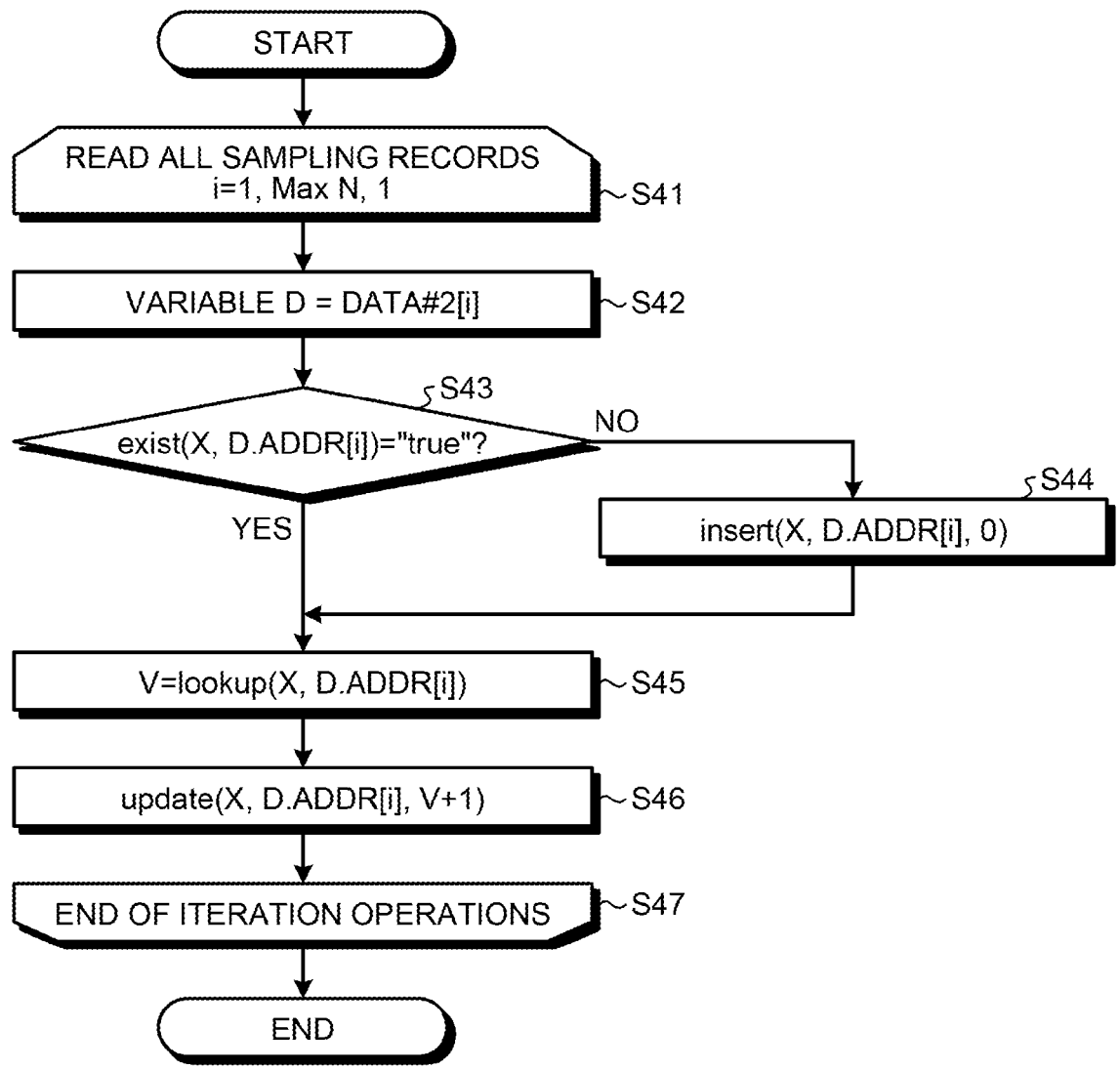
FIG. 11A is a flowchart for explaining a first example of a sampling result counting operation.

FIG. 11A is a flowchart for explaining a first example of a sampling result counting operation. In FIG. 11A is illustrated a sampling result counting operation for the return instruction address$_1$. As illustrated in FIG. 11A, the analyzing program 4 reads all sampling records one by one from the file DATA #2 (Step S41), and performs operations between Steps S41 and S47 with respect to each sampling record.

Thus, the analyzing program 4 sets DATA #2[i] in the variable D (Step S42), and determines whether or not the return instruction address$_1$ is present in X (Step S43). Herein, X represents a hash table in which a key represents a return instruction address and a value represents the appearance count. Moreover, D.ADDR[k] represents a return instruction address$_k$ of the sampling record D (k is an integer between 1 to N). Furthermore, exist (X, K) represents a function in which the value is either "true" if the key K is present in the hash table X or "false" if the key k is not present in the hash table X.

If the return instruction address is not present in the hash table X (Step S43 NO), then the analyzing program 4 adds an entry having D.ADDR[i] and the value "0" in the hash table X (Step S44). Herein, insert(X, K, VA) represents a function for adding an entry having the key K and a value VA in the hash table X.

Subsequently, the analyzing program 4 obtains, from the hash table X, the value having D.ADDR[i] as the key and stores the value in V (Step S45). If the return instruction address is present in the hash table X (Step S43 YES), the analyzing program 4 obtains, from the hash table X, the value having D.ADDR[i] as the key and stores the value in V (Step S45). Herein, lookup2(X, K) represents a function for obtaining the value having the key K from the hash table X.

Then, the analyzing program 4 updates that value in the hash table X which has D.ADDR[i] as the key to V+1 (Step S46). Herein, update2(X, K, VA) represents a function for updating that value in the hash table X which has the key K to VA (Step S47).

In this way, by counting the appearance count according to D.ADDR[i], the analyzing program 4 can count the sampling result according to the return instruction address$_1$.

Figure 11B:
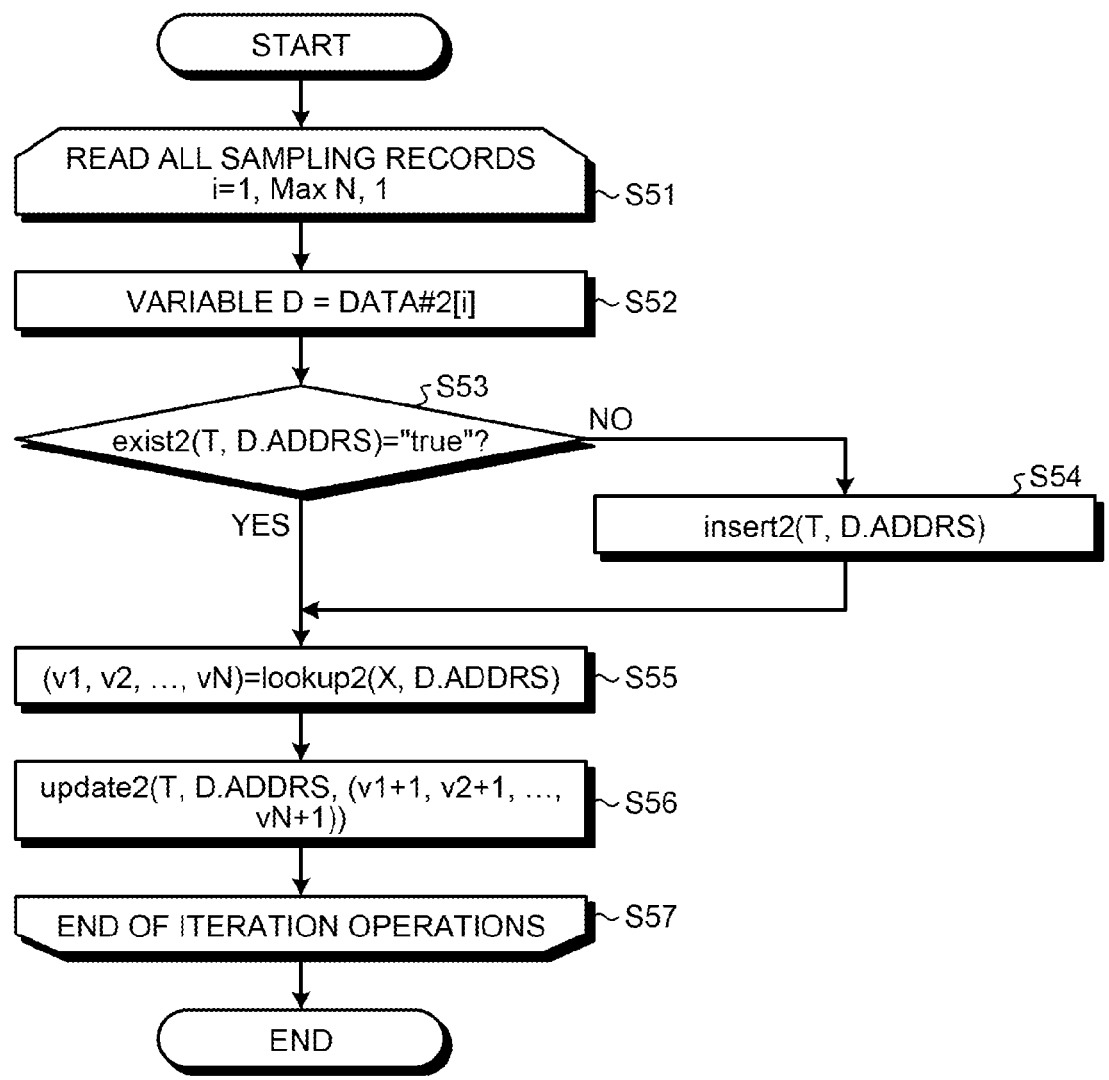
FIG. 11B is a flowchart for explaining a second example of the sampling result counting operation.
Figure 12:
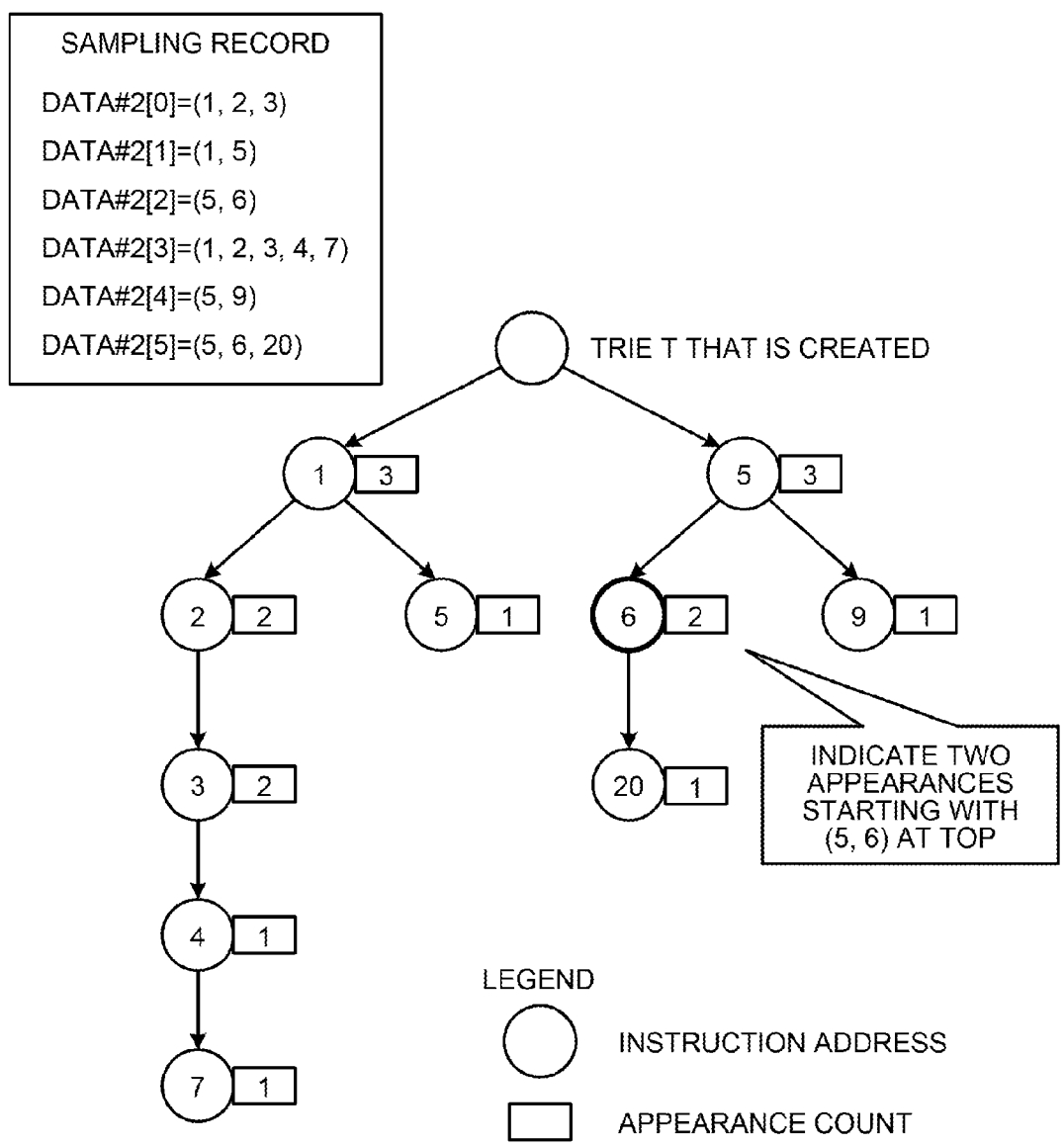
FIG. 12 is a diagram illustrating an exemplary trie.

FIG. 11B is a flowchart for explaining a second example of the sampling result counting operation. In FIG. 11B is illustrated an operation of creating a trie for calculating the breakdown of the sampling count of the return instruction addresses$_1, \ldots, _N$. Herein, a trie represents a tree in which the positions of nodes in the tree structure are associated with keys. An example of a trie is illustrated in FIG. 12 (described later).

As illustrated in FIG. 11B, the analyzing program 4 sequentially reads all sampling records from the file DATA #2 (Step S51), and performs operations between Steps S51 and S57 with respect to each sampling record.

Thus, the analyzing program 4 sets DATA #2[i] in the variable D (Step S52), and determines whether or not D.ADDRS is present in T (Step S53). Herein, T represents a trie in which a key represents a return instruction address list and a value represents the appearance count. Moreover, exist2(T, K) represents a function in which the value is either "true" if the key K is present in the trie or "false" if the key k is not present in the trie.

If D.ADDRS is not present in the trie (Step S53 NO), then the analyzing program 4 adds, in the trie, an entry in which D.ADDRS is the key and the values of all nodes in the path of the trie is "0" (Step S54). Herein, insert2(T, K) represents a function for adding an entry in which K is the key in the trie and the values of all nodes in the path of the trie is "0".

Then, the analyzing program 4 obtains, from the trie, the values of all nodes in the path having D.ADDRS as the key and stores the values in $v_1, v_2, \ldots, v_N$, respectively (Step S55). Herein, lookup2(T, K) represents a function for obtaining the values of all nodes in the path having the key K from the trie.

Subsequently, regarding the values of all nodes in the path having D.ADDRS as the key in the trie, the analyzing program 4 updates the values to $v_1+1, v_2+1, \ldots, v_N+1$, respectively (Step S56). Herein, update2(T, K, VL) represents a function for updating the values of all nodes in the path having the key K in the trie to values in a list VL.

In this way, by counting the node-by-node appearance count in the path having D.ADDRS as the key, the analyzing program 4 can calculate the breakdown of the sampling count of the return instruction addresses $_{1}, \ldots, _{N}$.

FIG. 12 is a diagram illustrating an exemplary trie. In FIG. 12 is illustrated a trie created from six sampling codes DATA #2[0] to DATA #2[5]. Herein, nodes are illustrated with circles, and the numbers written inside the nodes represent return addresses. As illustrated in FIG. 12, the trie is made of a subtree having a node$_1$ as the root and a subtree having a node$_3$ as the root. Moreover, for example, the subtree having the node$_1$ as the root is made of a subtree having a node$_2$ as the root and a leaf of the node$_5$. Meanwhile, DATA #2[1]=(1, 5) corresponds to a path from the node$_1$ to the node$_3$.

The node$_1$ appears in DATA #2[0]=(1, 2, 3), DATA #2[1]=(1, 5), and DATA #2[3]=(1, 2, 3, 4, 7). Hence, the node$_1$ has the appearance count "3". In FIG. 2, the appearance counts are indicated by the numbers written inside quadrangles on the right side of the nodes. Moreover, for example, the appearance count "2" of the node$_6$ implies that there are two appearances starting with (5, 6) at the top.

Figure 13:
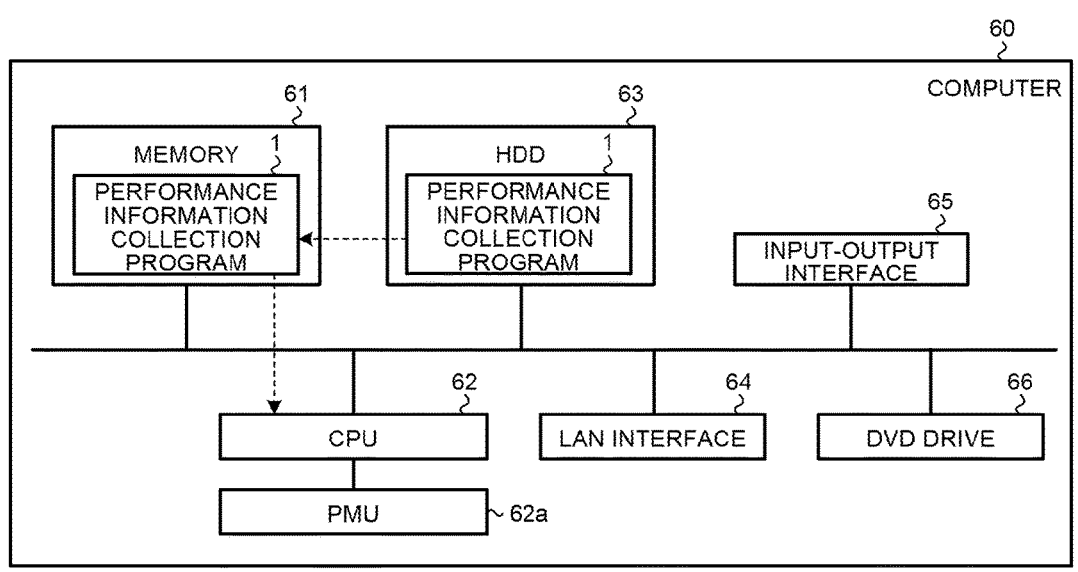
FIG. 13 is a diagram illustrating a configuration of a computer that executes the performance information collection program.

Given below is the explanation of a configuration of a computer that executes the performance information collection program 1. FIG. 13 is a diagram illustrating a configuration of a computer that executes the performance information collection program 1. As illustrated in FIG. 13, a computer 60 includes the memory 61, the CPU 62, a hard disk drive (HDD) 63, a local area network (LAN) interface 64, an input-output interface 65, and a digital video disk (DVD) drive 66.

The memory 61 represents a random access memory (RAM) that is used in storing computer programs as well as storing intermediate results obtained during execution of the computer programs. The CPU 62 represents a central processor that reads computer programs from the memory 61 and executes them. The HDD 63 represents a disk device for storing computer programs and data. The LAN interface 64 represents an interface for connecting the computer 60 to other computers via a LAN. The input-output interface 65 represents an interface for connecting an input-output device, such as a mouse or a keyboard, and a display device. The DVD drive 66 represents a device for reading and writing DVDs.

The performance information collection program 1 is stored in a DVD. Thus, the DVD drive 66 reads the performance information collection program 1 from the DVD and installs it in the computer 60. Alternatively, the performance information collection program 1 is stored in the database of another computer system connected via the LAN interface 64, and is read from that database and installed in the computer 60. The performance information collection program 1 that is installed is then stored in the HDD 63; and the CPU 62 reads the performance information collection program 1 into the memory 61 and executes it.

As described above, in the embodiment, when a function is called, the unwind_stack program 21 reads a series of return instruction addresses, which are stored in the stack 61a, as function calling relationship information and stores the return instruction addresses in the calling-relationship-storage dedicated registers 85. At that time, the unwind_stack program 21 selects either the hash format or the pack format, and stores the function calling relationship information in the selected format in the calling-relationship-storage dedicated registers 85. Thus, as compared to a case in which all information is stored in the pack format, the performance information collection program 1 can reduce the volume of the function calling relationship information.

Moreover, in the embodiment, the analyzing program 4 creates the reverse hash table 43a from the sampling records having the pack format, and restores the sampling records having the hash format using the reverse hash table 43a. Thus, the performance information collection program 1 not only can reduce the volume of the function calling relationship information but also can prevent a decrease in the number of sampling records.

Furthermore, in the embodiment, the unwind_stack program 21 stores the function calling relationship information in the calling-relationship-storage dedicated registers 85. That enables the performance collection interrupt program 22 to collect the function calling relationship information with ease.

Meanwhile, in the embodiment, the explanation is given for a case in which, when a function is called, the stack 61a is stacked with the return instruction addresses, the value of the previous base pointer, and the local variables. However, the present invention is not limited to that case, and can be implemented in an identical manner also in the case in which other data is further stacked in the stack 61a.

Moreover, in the embodiment, the explanation is given for a case in which the function calling relationship information is compressed using the hash function. However, the present invention is not limited to that case, and can be implemented in an identical manner also in the case in which the function calling relationship information is compressed using another lossy compression function other than the hash function.

Thus, according to the embodiment, it becomes possible to reduce the volume of function calling relationship information in a memory.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A function-calling-information collection method comprising:
 collecting, at time of execution of a function, calling information of concerned function;
 selecting in every collecting the calling information, using a processor, whether to perform lossy compression of the collected calling information; and
 storing, in a memory unit, the calling information compressed by a lossy compression when the lossy compression is selected;
 storing, in the memory unit, the calling information without compression or compressed by a lossless compression when the lossy compression is not selected;
 creating, using the calling information without compression or the calling information compressed by the lossless compression, a reverse hash table in which the calling information compressed by the lossy compression is associated with the calling information without compression or the calling information compressed by the lossless compression, the reverse hash table being searched with the calling information compressed by the lossy compression as a key to obtain the calling information without compression or the calling information compressed by the lossless compression;
restoring, based on the reverse hash table, original calling information from the calling information compressed by the lossy compression; and
counting calling relationship of a function based on the calling information without compression or the calling information compressed by the lossless compression and based on the original calling information restored at the restoring.

2. The function-calling-information collection method according to claim 1, wherein
the memory unit is a register;
the method further comprising:
reading the calling information, stored in the register at predetermined time intervals; and
storing a plurality of pieces of the calling information read at the reading in a memory, wherein
the restoring and the counting use a plurality of pieces of the calling information stored in the memory.

3. A non-transitory computer-readable recording medium having stored a function-calling-information collection program that causes a computer to execute a process comprising:
collecting, at time of execution of a function, calling information of concerned function;
selecting in every collecting the calling information whether to perform lossy compression of the collected calling information;
storing, in a memory unit, the calling information compressed by a lossy compression when the lossy compression is selected;
storing, in the memory unit, the calling information without compression or compressed by a lossless compression when the lossy compression is not selected;
creating, using the calling information without compression or the calling information compressed by the lossless compression, a reverse hash table in which the calling information compressed by the lossy compression is associated with the calling information without compression or the calling information compressed by the lossless compression, the reverse hash table being searched with the calling information compressed by the lossy compression as a key to obtain the calling information without compression or the calling information compressed by the lossless compression;
restoring, based on the reverse hash table, original calling information from the calling information compressed by the lossy compression; and
counting calling relationship of a function based on the calling information without compression or the calling information compressed by the lossless compression and based on the original calling information restored at the restoring.

\* \* \* \* \*